United States Patent Office 2,848,493
Patented Aug. 19, 1958

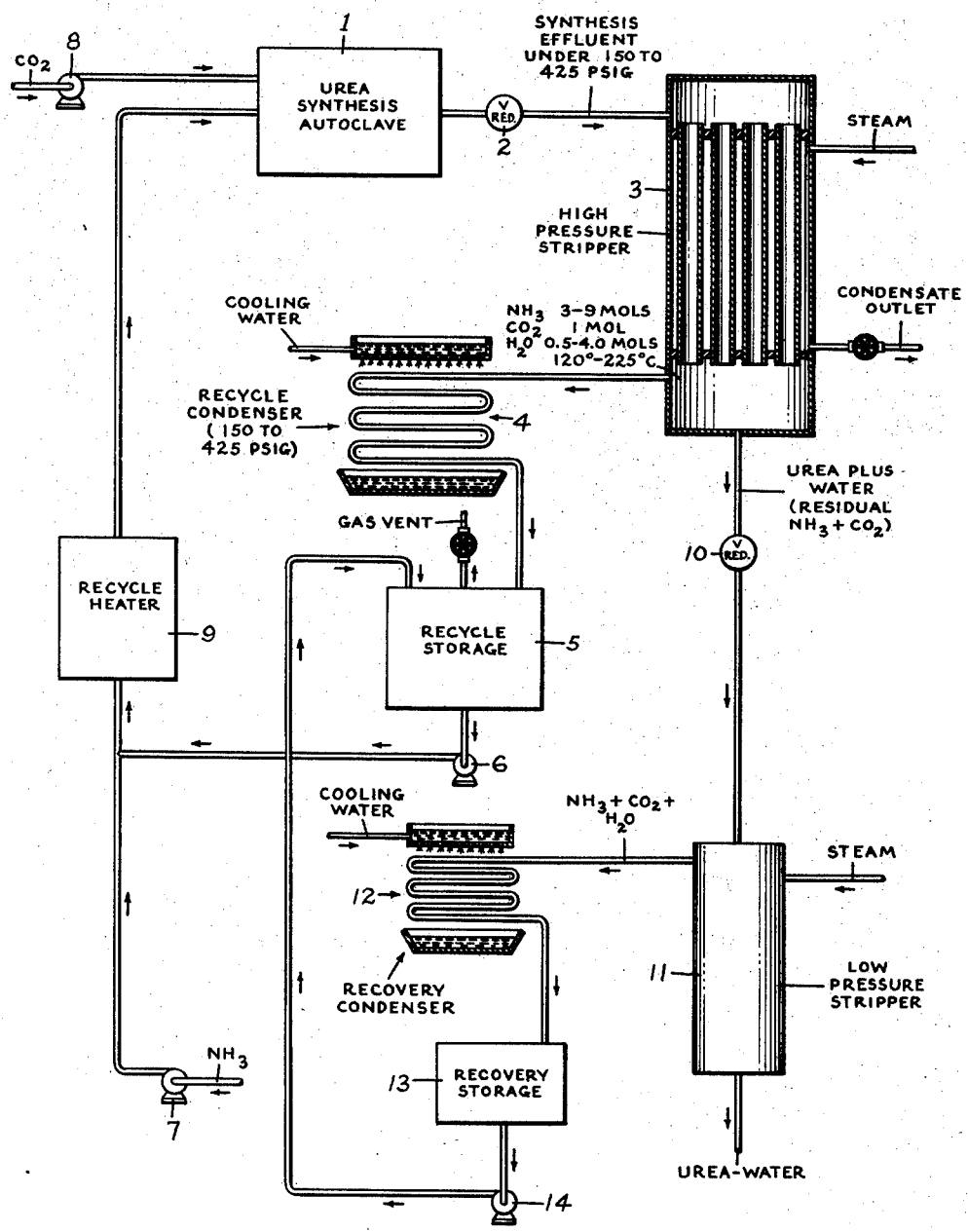

2,848,493

PROCESS FOR SYNTHESIS OF UREA

William L. E. Dewling and Samuel W. Grossmann, Petersburg, Va., assignors to Allied Chemical Corporation, New York, N. Y., a corporation of New York Application June 27, 1955, Serial No. 518,044

13 Claims. (Cl. 260—555)

This invention is directed to a process for synthesizing urea from ammonia and carbon dioxide particularly characterized by a novel method for recovering unconverted ammonia and carbon dioxide from the synthesis product and returning these recovered materials to the urea synthesis step for their conversion into urea.

The synthesis of urea by reacting ammonia and carbon dioxide under temperatures and pressures sufficiently high to maintain these materials in the form of a melt of their compounds, for example a melt of ammonium carbamate, has long been known and used for the large-scale production of urea. Ammonia and carbon dioxide are pumped under high pressures through a synthesis autoclave in which a partial conversion of these reactants to urea occurs at elevated temperatures of the order of 150° to 200° C. It is known that by employing an excess of ammonia over the stoichiometric 2/1 mol ratio $NH_3/CO_2$ for urea formation, the yields of urea are increased and other advantages in operating the process are obtained. Throughout this specification the urea yields or conversions to urea referred to are the percent conversions to urea of the carbon dioxide in the urea synthesis feed per pass through the synthesis step.

It has also been proposed to include water with the materials supplied to the synthesis autoclave. However, the introduction of water has generally been considered undesirable in practice. Accordingly, water has been excluded or the amount present in the materials fed to the autoclave generally has been kept as small as practicable.

The reaction of ammonia and carbon dioxide to form urea involves the formation of one mol of water for every mol of urea and is an equilibrium reaction. In practice, conversions of 40% to 50% per pass through the synthesis autoclave are commonly obtained, although in some cases higher conversions up to about 70%, for example, are obtainable. From the beginning of the development of the synthetic urea process, therefore, a major problem has been to discover commercially practicable procedures for recovering unconverted ammonia and carbon dioxide in the synthesis effluent and recycling these recovered materials to the high pressure synthesis step.

The difficulties in developing suitable recycle methods have been due to the chemical and physical characteristics of the components of the synthesis melt and of mixtures of ammonia and carbon dioxide. Even at relatively low temperatures and pressures as compared with those maintained in the synthesis step, free ammonia vaporizes and may be recovered from the synthesis melt. The ammonia and carbon dioxide which are present in combination as ammonium carbamate or other ammonia-carbon dioxide salts, require higher temperatures and lower pressures for their distillation. Under these latter conditions the urea and water present tend to react, reforming ammonia and carbon dioxide. The urea itself tends to react to form decomposition products. Furthermore, as the temperatures and pressures employed in distilling the combined ammonia and carbon dioxide from the urea synthesis melt are increased, the corrosiveness of the materials toward metals used for the construction of the apparatus in which the operations are carried on, rapidly increases.

When a mixture of recovered ammonia and carbon dioxide gases is cooled or compressed to form a liquid condensate which may be pumped back to the urea synthesis against the high pressures maintained therein, these gases recombine to form normally solid salts. To recover the ammonia and carbon dioxide as a liquid melt or solution which may be recycled without unduly affecting the synthesis step or the overall economics of the process has been the aim of continuing experimentation ever since the production of synthetic urea was undertaken.

We have discovered that by supplying to the urea synthesis step water and excess ammonia over that stoichiometrically required for reaction with the carbon dioxide supplied, and by distilling the synthesis effluent under certain conditions, most of the unreacted ammonia and carbon dioxide in the effluent are recovered as a gas-vapor mixture which, when cooled under pressure condenses to form a liquid which can be recycled to the urea synthesis step. This is accomplished while maintaining process conditions such that there is no undue increase in corrosion of equipment, decrease in conversion of the carbon dioxide and ammonia per pass through the synthesis step, or increase in the amounts of materials which must be processed in a plant operating at a given capacity for production of urea. Our novel process has proven itself both technically and economically advantageous in commercial plant operation.

In operating in accordance with our invention, ammonia, carbon dioxide and water are subjected to urea synthesis conditions, with excess ammonia supplied in amount greater than the stoichiometric ratio $2NH_3/1CO_2$ such that the synthesis effluent contains more than 3.0 and not substantially more than nine mols ammonia for every one mol carbon dioxide. There is also introduced in the feed to the urea synthesis step, a quantity of water such that the synthesis effluent contains more than 0.5 mol of water for every one mol of carbon dioxide. Preferred operation is to maintain the mol ratios of 5 to $9NH_3/2$ to $4H_2O/1CO_2$ in the synthesis effluent.

These ratios of ammonia and water to carbon dioxide in the synthesis effluent depend not only on the ratio in which the ammonia, carbon dioxide and water are supplied to the urea synthesis, but also the conversion of the carbon dioxide to urea as determined by the particular conditions maintained in the synthesis step itself. The synthesis effluent will contain the water formed by the urea synthesis reaction in addition to that in the feed to the synthesis reactor. A part of the water in the effluent is recovered with the unreacted ammonia and carbon dioxide and recycled to the urea synthesis reactor. The excess water present in the synthesis effluent over that recovered and recycled is removed from the synthesis system with the urea formed by the synthesis reaction.

The effluent from the urea synthesis is heated under a pressure in the range of 150–425 p. s. i. g. to expel 90% or more of its content of unreacted ammonia and carbon dioxide, accompanied by water vapor as a gas-vapor mixture at a temperature of 120° to 225° C., containing ammonia, water and carbon dioxide in the mol ratios of 3 to $9NH_3/0.5$ to $4.0H_2O/1CO_2$. It is much better to heat the effluent under 275 to 325 p. s. i. g. to a temperature at which the evolved gas-vapor mixture is at 160° to 190° C., preferably at 160° to 170° C., to recover a gas-vapor mixture containing the mol ratios of 4 to $7NH_3/1.5$ to $2.5H_2O/1CO_2$. Under these conditions at least 90%, e. g. about 95% of both the ammonia and carbon dioxide present in the synthesis effluent are readily recovered therefrom in a liquid form for recycling to the urea synthesis. Further, the quantity of recycled material is kept relatively small, making our process carried out under the preferred conditions, especially economical.

The gas-vapor mixture thus stripped from the synthesis effluent is separated from the unvaporized material, principally containing urea and unvaporized water. This mixture is cooled to a temperature above the salting out temperature of the resulting condensate, under a pressure at which substantially all the ammonia and carbon dioxide are condensed and recovered as an aqueous ammoniacal solution or melt of salts of ammonia and carbon dioxide. The salting out temperatures of the condensates range from 30° to 95° C. Our process is operated with the temperatures in the condensing step in the range above 30° to about 115° C. sufficiently above the salting out temperature of the condensate (for example, about 10° C.) to prevent any difficulty arising from deposition of solids. The gas-vapor mixture is preferably cooled to condense it while still under substantially the pressure at which it was recovered from the urea synthesis effluent. The liquid condensate, maintained at a temperature above its salting out temperature, is pumped from the pressure under which it is formed, to the higher pressure of the urea synthesis step and is recycled, together with make-up ammonia and carbon dioxide, for further conversion of recycled material to urea.

The high pressure stripping of the ammonia and carbon dioxide from the urea synthesis effluent involves a suitable condensation temperature and pressure of heating the synthesis effluent which yields a gas-vapor mixture which, upon condensation by cooling under pressures, preferably no higher than those maintained in the high pressure stripping step, forms a liquid condensate having a salting out temperature below the temperature to which the gas-vapor mixture is cooled to condense it. The following table shows the relationship between the pressures and temperatures maintained in the high pressure stripping step of our process to evolve from a urea synthesis effluent gas-vapor mixture containing ammonia and carbon dioxide in mol ratios in the range 3 to $9NH_3/1CO_2$ and mol ratios of water to carbon dioxide such that under substantially the same pressure as maintained in the stripping step, the mixture condenses when cooled to a temperature not greatly above its salting out temperature at which it can be recycled without difficulties arising due to deposition of solids.

| Pressure in Stripper and Condenser | Gas Vapor Mixture | | | Condensate Salting out Temperature, °C. |
|---|---|---|---|---|
| | Temperature, °C. | Mol Ratios | | |
| | | $H_2O/1CO_2$ | $NH_3/1CO_2$ | |
| 150 p. s. i. g | 125 to 175 | 1.9 to 4 | 3 to 9 | 70 to 30. |
| 300 p. s. i. g | 130 to 205 | 1 to 4 | 3 to 9 | 84 to 30. |
| 425 p. s. i. g | 120 to 225 | 0.5 to 4 | 3 to 9 | 95 to 30. |

In further explanation of the operating conditions for the stripping step of our process, it is pointed out that for a given temperature of the gas-vapor mixture evolved in the stripping step, an increase in the pressure decreases the $H_2O/CO_2$ ratio and increases the salting out temperature of the condensate. For a given pressure maintained in the stripping step, an increase in the temperature increases the $H_2O/CO_2$ ratio in the gas-vapor mixture and decreases the salting out temperature of the condensate.

This effect of temperature and pressure in the stripping step on the ratio of water to carbon dioxide in the evolved gas-vapor mixture and the effect that ratio has on the salting out temperature of the condensate, are important, controlling factors in operating a process in accordance with our invention. Thus, the pressure under which the synthesis effluent is stripped and that under which the gas-vapor mixture is cooled to form the liquid condensate are maintained at predetermined values within the described limits for these pressures. Both (a) the heating of the synthesis effluent in the stripping step is controlled to maintain a temperature of the gas-vapor mixture evolved which is in the ranges stated herein, and (b) the composition of the urea synthesis effluent supplied to the stripping step with respect to its mol ratios of ammonia, water and carbon dioxide is maintained at values in the ranges herein defined, such that the mol ratio of water to carbon dioxide is high enough to maintain the salting out temperature of the liquid condensate below the temperature at which the ammonia, carbon dioxide and water are condensed to form the liquid condensate.

The stripping of the urea synthesis effluent, which is a characteristic feature of our invention, is best accomplished by rapidly supplying to the synthesis effluent the heat required for vaporizing the ammonia, carbon dioxide and a portion of the water. This is effectively done by film evaporation, in which a film of the synthesis effluent flows over heat transfer surfaces, preferably by falling film evaporation. In this latter procedure, the effluent is introduced into the top of a shell and tube, film evaporator through which it flows downwardly over the internal tube surfaces in indirect heat transfer with steam. The evolved gases and vapors also flow downwardly within the tubes cocurrently with the flow of the liquid. The evolved gas-vapor mixture is separated from the unvaporized urea-water melt in the bottom of the evaporator. In the evaporator the synthesis effluent is heated to temperatures such that the evolved gas-vapor mixture drawn from the bottom of the evaporator is at a temperature in the range 120° to 225° C., preferably at about 160° C. to about 190° C. The gas-vapor mixture and unvaporized urea-water melt are separately withdrawn from the bottom of the evaporator.

By employing film evaporation for the high pressure stripping of ammonia and carbon dioxide from the urea synthesis effluent in accordance with our invention, the short time of contact of the liquid flowing as a film in contact with the heat transfer surface, permits stripping 90% or more of the unreacted ammonia and carbon dioxide from the effluent melt, including that present as ammonia-carbon dioxide salts, without substantial decomposition of urea or loss of urea due to its reaction with the water present. The preferred cocurrent flow of the evolved vapors (ammonia, carbon dioxide and water) with the liquor while it is in contact with the heating surfaces also serves to minimize loss of urea in stripping the synthesis effluent.

The accompanying drawing is a flow sheet illustrating processes operating in accordance with our invention. It includes a preferred procedure for recovering and utilizing the residual small amounts of ammonia and carbon dioxide in the urea-water composition left after most of the unreacted ammonia and carbon dioxide in a urea synthesis effluent has been recovered by the process of the invention. While suitable operating conditions are given in describing the procedures illustrated in the drawing and the more specific procedures of the examples, these are not intended as limitations on our invention in its broadest aspects, but as illustrative thereof and of preferred modes of carrying out that invention.

With reference to the drawing, carbon dioxide and ammonia are pumped into a urea synthesis autoclave in which they are reacted under a high pressure at an elevated temperature, for example, 2000 to 3200 p. s. i. g. and 170° to 195° C., to form urea. The synthesis effluent leaving the autoclave, including any inert gases introduced with the carbon dioxide or ammonia, passes through a pressure reducing valve 2 by which the pressure on the effluent is let down, best to a pressure in the range about 290 to about 300 p. s. i. g. The effluent is introduced at this lower pressure into the top of a shell and tube film evaporator 3 serving as a high pressure stripper. In this evaporator the liquid effluent flows downwardly over the inner surfaces of the tubes heated by high pressure steam at 195° to 220° C. introduced into the steam chest of the evaporator. A gas-vapor mixture of ammonia, carbon dioxide and water is evolved from the liquid effluent and passes downwardly through the interior of the stripper tubes in cocurrent flow with the liquid being heated to strip it of these materials.

From the bottom of the high pressure stripper the gas-vapor mixture at a temperature in the range about 160° to about 190° C. is withdrawn separately from the liquor and passed into a recycle condenser 4. Here it is cooled to condense the mixture as an aqueous ammoniacal solution or melt of salts of ammonia and carbon dioxide. Under the pressure in the recycle condenser, which is substantially the same as that in the high pressure stripper, the gas-vapor mixture condenses by cooling it to a temperature in the range about 65° C. to about 85° C., which is above the temperature at which solid salts out from the condensate.

The liquid condensate is passed from the condenser to a recycle storage vessel 5, where it is maintained at temperatures above its salting out temperature and from which the liquid is withdrawn by a pump 6 which raises the pressure to that required to recycle the liquid to the urea synthesis autoclave. Make-up ammonia is introduced into the recycle liquid from a pump 7, and the resulting mixture is heated to 125°-160° C. in the recycle heater 9. Make-up carbon dioxide is introduced into the urea synthesis system by a pump 8 in amounts which, with the recycle and the make-up ammonia, provide the desired content of ammonia and carbon dioxide in the urea synthesis feed.

In operating a process in the manner described above and illustrated in the drawing, a predetermined pressure in the range set forth above is maintained in the condenser and a temperature is maintained which is above the salting out temperature of the condensate and at which the gas-vapor mixture from the high pressure stripper substantially completely condenses as a liquid condensate. The pressure in the high pressure stripper will be substantially the same as that in the condenser, the pressure differential between the stripper and condenser being that incidental to the flow of the gas-vapor mixture in passing from one to the other through the interconnecting piping. The heating of the synthesis effluent in the stripper is then regulated to maintain the temperature of the evolved gas-vapor mixture high enough so that the salting out temperature of the condensate remains somewhat below the temperature maintained in the condenser.

The procedure thus carried out in accordance with our invention provides a continuously operating urea synthesis and recovery system by which 90% to 95% or more of the unreacted ammonia and carbon dioxide in the urea synthesis effluent is effectively and economically recovered and recycled for conversion to urea.

The aqueous melt of urea, accompanied by residual unconverted ammonia and carbon dioxide from which the recycled material has been separated, may be treated in any desired manner for recovery of its urea content and utilization of its ammonia content and, if desired, its carbon dioxide content. This residual ammonia and carbon dioxide, which may amount to 5% to 10% or less of the unreacted ammonia and carbon dioxide in the synthesis effluent, is preferably also recovered and recycled to the urea synthesis. This liquid is passed through a pressure reducing valve 10 by which the pressure on the liquid is let down to 25 to 70 p. s. i. g. The material at this lower pressure passes into a low pressure stripper 11. Like stripper 3, this is also of the shell and tube, falling film evaporator type construction. The heating steam is supplied at 100 to 200 p. s. i. g. pressure (about 170° to 200° C.). Substantially all the residual ammonia and carbon dioxide are evolved accompanied by water vapor and are passed from the top of the low pressure stripper to recovery condenser 12 where they are condensed by cooling to about 35° C. The condensed liquid is passed into recovery storage 13 from which it is drawn by pump 14 and introduced into recycle storage 5 for mixing therein with the recycle condensate and return to the urea synthesis. Since the condensate in recovery storage 13 principally contains ammonia and water, mixing it with condensate from recycle condenser 4 lowers the salting out temperature of this condensate and thus facilitates maintaining it liquid during storage and pumping it back to the urea synthesis step.

The following examples of processes carried out by the procedure described above and shown in the drawing further illustrate our invention.

*Example 1.*—Ammonia, carbon dioxide and water in the mol ratios of about $4NH_3/1H_2O/1CO_2$ are introduced into the urea synthesis autoclave where, at a temperature of 190° C. and under a pressure of 3150 p. s. i. g., urea is formed in yields of substantially 45%. The resulting urea synthesis effluent contains mol ratios of substantially $5.6NH_3/2.6H_2O/1CO_2$. The pressure on the effluent is let down to 290 p. s. i. g. and the effluent is introduced into the top of the shell and tube, high pressure stripper. In this stripper the effluent is heated by steam at 217° C. At this pressure and steam temperature, about 96% of the unconverted ammonia and about 97% of the unconverted carbon dioxide in the synthesis effluent are stripped therefrom as a gas-vapor mixture having a temperature of 167° C. and containing ammonia, carbon dioxide and water in the mol ratios of $5.6NH_3/1.8H_2O/1CO_2$. This mixture is drawn from the bottom of the high pressure stripper, separated from the unvaporized liquid containing urea and residual ammonia and carbon dioxide, and is cooled in the recycle condenser to 65° C. The resulting condensate remains liquid at this temperature since it has a salting out temperature of about 57° C. This liquid condensate is passed to the recycle storage, where it is maintained at about 65° C. From storage the liquid condensate is pumped to the recycle heater, where it is heated to 130° C., and thence to the urea synthesis autoclave. Make-up ammonia and carbon dioxide are also introduced to the urea synthesis in amounts such that with the recycled materials the desired ratio of about $4NH_3/1H_2O/1CO_2$ is maintained in the urea synthesis feed.

*Example 2.*—Ammonia, carbon dioxide and water in the mol ratios of $4NH_3/1H_2O/1CO_2$ are introduced into the urea synthesis autoclave where, at a temperature of about 197° C. and under a pressure of 3150 p. s. i. g., urea is formed in yields of substantially 55%. The resulting urea effluent contains mol ratios of substantially $6.5NH_3/3.4H_2O/1CO_2$. The pressure on the urea synthesis effluent is let down to 300 p. s. i. g. and the effluent is introduced into the top of the shell and tube, high pressure stripper. This stripper is heated by steam at 217° C. At this pressure and temperature, about 95% of the unconverted ammonia and about 96% of the unconverted carbon dioxide in the effluent are stripped therefrom as a gas-vapor mixture having a temperature of 160° C. and containing ammonia, carbon dioxide and water in the mol ratios of $6.4NH_3/2.0H_2O/1CO_2$. This mixture is drawn from the bottom of the stripper, separated from the unvaporized liquid, and is cooled in the recycle condenser to 66° C. The resulting condensate remains liquid at this temperature since it has a salting out temperature of about 53° C. This liquid condensate is passed to the recycle storage.

The aqueous melt of urea, accompanied by residual ammonia and carbon dioxide is passed through a pressure reducing valve to the top of the shell and tube low pressure stripper, which is operated at 60 p. s. i. g. The heating steam is supplied at 190° C. Substantially all residual ammonia and carbon dioxide are vaporized, accompanied by water vapor. Vapors are passed to the recovery condenser, where they are condensed at about 35° C. The condensate is sent to recovery storage from which it is drawn by pump and introduced into recycle storage. It mixes with condensate from the recycle condenser and the mixture is maintained at about 67° C. Liquid in recycle storage, containing ammonia, carbon dioxide and water in the mol ratios $6.5NH_3/2.2H_2O/1CO_2$, is pumped to the recycle heater, where it is heated to about 135° C., and thence to the urea synthesis autoclave. Make-up ammonia and carbon dioxide are also introduced to the urea synthesis in amounts such that with the recycled materials the mol ratio of about $4NH_3/1H_2O/1CO_2$ is maintained in the urea synthesis feed.

*Example 3.*—Ammonia, carbon dioxide and water in the mol ratios of $3NH_2/1.8H_2O/1.0CO_2$ are introduced into the urea synthesis autoclave where, at a temperature of 194° C. and under a pressure of 2550 p. s. i. g., urea is formed in yields of substantially 23%. The urea synthesis effluent contains mol ratios of substantially $3.3NH_3/2.6H_2O/1CO_2$. The pressure on this effluent is let down to 175 p. s. i. g. and the effluent is introduced into the top of the shell and tube, high pressure stripper. This stripper is heated by steam at 195° C. At this pressure and temperature, about 95% of the unconverted ammonia and about 96% of the unconverted carbon dioxide in the synthesis effluent are stripped therefrom as a gas-vapor mixture having a temperature of 159° C. and containing ammonia, carbon dioxide and water in the mol ratios of $3.2NH_3/2.2H_2O/1CO_2$. This gas-vapor mixture is drawn from the bottom of the stripper, separated from the unvaporized liquid, and is cooled in the recycle condenser to 85° C. The resulting condensate remains liquid at this temperature since it has a salting out temperature of about 63° C. This liquid condensate is passed to the recycle storage.

The aqueous melt of urea, accompanied by residual ammonia and carbon dioxide drawn from the bottom of the high pressure stripper is passed through a pressure reducing valve to the top of the shell and tube low pressure stripper, which is operated at 70 p. s. i. g. The heating steam is supplied at 200° C. Substantially all residual ammonia and carbon dioxide are vaporized, accompanied by water vapor. These vapors are passed to the recovery condenser, where they are condensed at about 35° C. The resulting condensate is passed to the recycle storage where it mixes with condensate from the recycle condenser. The mixture is maintained at about 90° C. Liquid in recycle storage, containing ammonia, carbon dioxide and water in the mol ratios $3.3NH_3/2.4H_2O/1CO_2$, is pumped to the recycle heater where it is heated to about 155° C., and thence to the urea synthesis autoclave. Make-up ammonia and carbon dioxide are also introduced to the urea synthesis in amounts such that with the recycled materials the mol ratio of about $3NH_3/1.8H_2O/1CO_2$ is maintained in the urea synthesis feed.

*Example 4.*—Ammonia, carbon dioxide and water in the mol ratio of $4.7NH_3/2H_2O/1CO_2$ are introduced into the urea synthesis autoclave where, at a temperature of 197° C. and under a pressure of 2930 p. s. i. g., urea is formed in yields of substantially 45%. The resulting urea synthesis effluent contains mol ratios of $6.9NH_3/4.5H_2O/1CO_2$. The pressure on the urea synthesis effluent is let down to 260 p. s. i. g. and the effluent is introduced into the top of the shell and tube, high pressure stripper. This stripper is heated by steam at 215° C. At this pressure and temperature, about 95% of the unconverted ammonia and about 96% of the unconverted carbon dioxide in the synthesis effluent are stripped therefrom as a gas-vapor mixture having a temperature of 173° C. and containing ammonia, carbon dioxide and water in the mol ratios of $6.9NH_3/3.5H_2O/1CO_2$. This gas-vapor mixture is drawn from the bottom of the high pressure stripper, separated from the unvaporized liquid, and is cooled in the recycle condenser to 68° C. The resulting condensate remains liquid at this temperature since it has a salting out temperature of about 35° C. This liquid condensate is passed to the recycle storage.

The aqueous melt of urea, accompanied by residual ammonia and carbon dioxide, drawn from the high pressure stripper is passed through a pressure reducing valve to the top of the shell and tube low pressure stripper, which is operated at 50 p. s. i. g. The heating steam is supplied at 170° C. Substantially all residual ammonia and carbon dioxide are vaporized, accompanied by water vapors. The vapors are passed to the recovery condenser, where they are condensed at about 30° C. The condensate is sent to recovery storage from which it is drawn by pump and introduced into recycle storage. It mixes with condensate from recovery storage, and the mixture is maintained at about 72° C. Liquid in recycle storage, containing ammonia, carbon dioxide and water in the mol ratios $6.9NH_3/3.6H_2O/1CO_2$, is pumped to the recycle heater where it is heated to about 140° C., and thence to the urea synthesis autoclave. Make-up ammonia and carbon dioxide are also introduced to the urea synthesis in amounts such that with the recycled materials the mol ratio of about $4.7NH_3/2H_2O/1CO_2$ is maintained in the urea synthesis feed.

*Example 5.*—Ammonia, carbon dioxide and water in the mol ratios of $4NH_3/1.7H_2O/1CO_2$ are introduced into the urea synthesis autoclave where, at a temperature of 197° C. and under a pressure of 2950 p. s. i. g., urea is formed in yields of substantially 49%. The synthesis effluent contains ratios of substantially $5.9NH_3/4.3H_2O/1CO_2$. The pressure on the effluent is let down to 220 p. s. i. g. and the effluent is introduced into the top of the shell and tube, high pressure stripper. This stripper is heated by steam at 207° C. At this pressure and temperature, about 92% of the unconverted ammonia and about 96% of the unconverted carbon dioxide in the synthesis effluent are stripped therefrom as a gas-vapor mixture having a temperature of 169° C. and containing ammonia, carbon dioxide and water in the mol ratios of $5.7NH_3/3.2H_2O/1CO_2$. The gas-vapor mixture is drawn from the bottom of the stripper, separated from the unvaporized liquid, and is cooled in the recycle condenser to 71° C. The resulting condensate remains liquid at this temperature since it has a salting out temperature of about 40° C. This liquid condensate is passed to the recycle storage.

The aqueous melt of urea, accompanied by residual ammonia and carbon dioxide, drawn from the high pressure stripper is passed through a pressure reducing valve to the top of the shell and tube low pressure stripper, which is operated at 50 p. s. i. g. The heating steam is supplied at 180° C. Substantially all residual ammonia and carbon dioxide are vaporized, accompanied by water vapor. Vapors are passed to the recovery condenser, where they are condensed at about 30° C. The condensate is sent to recovery storage from which it is drawn by pump and introduced into recycle storage. Here it mixes with the condensate from the recycle condenser and is maintained at about 76° C. Liquid in recycle storage, containing ammonia, carbon dioxide and water in the mol ratios $5.9NH_3/3.3H_2O/1CO_2$, is pumped to the recycle heater where it is heated to about 150° C., and thence to the urea synthesis autoclave. Make-up ammonia and carbon dioxide are also introduced to the urea synthesis in amounts such that with the recycled materials the mol ratio of about $4NH_3/1.7H_2O/1CO_2$ is maintained in the urea synthesis feed.

We claim:

1. A process for the synthesis of urea from carbon dioxide and ammonia, including recovery of unreacted ammonia and carbon dioxide from the urea synthesis effluent and their return to the urea synthesis together with make-up ammonia and carbon dioxide, which comprises: reacting in the urea synthesis step a feed containing water and ammonia and carbon dioxide in a mol ratio substantially greater than $2NH_3/1CO_2$ to form a synthesis effluent containing more than 3.0 and not substantially more than 9 mols ammonia and more than 0.5 mol water for every 1 mol of carbon dioxide, stripping from the urea synthesis effluent water and unreacted ammonia and carbon dioxide by heating the effluent under a pressure in the range 150 to 425 p. s. i. g. to evolve therefrom at least 90% of the ammonia and carbon dioxide accompanied by water as a gas-vapor mixture having a temperature in the range 120° to 225° C., separating said gas-vapor mixture from the unvaporized liquid containing urea, cooling said gas-vapor mixture under 150 to 425 p. s. i. g. pressure to a temperature in the range above 30° C. to about 115° C. at which the ammonia, carbon dioxide and water contained therein are substantially completely condensed to form a liquid condensate, maintaining the pressure under which the synthesis effluent is stripped and the pressure under which the resulting gas-vapor mixture is cooled to form the liquid condensate at predetermined values within the aforedefined limits for these pressures and maintaining (a) the gas-vapor mixture evolved in the stripping step at a temperature in the aforesaid range of 120° to 225° C., and (b) a composition of the urea synthesis effluent with respect to its mol ratios of ammonia, water and carbon dioxide, such that the mol ratios of ammonia, water and carbon dioxide in the gas-vapor mixture from the said stripping are in the ranges of 3 to 9 $NH_3$ 0.5 to 4 $H_2O/1CO_2$ and the mol ratio of water to carbon dioxide is high enough to maintain the salting out temperature of said liquid condensate at a temperature in the range 30° to 95° C. which is below the temperature at which the ammonia, carbon dioxide and water of said gas-vapor mixture are condensed to form said liquid condensate, and returning said liquid condensate to the urea synthesis step as a part of the feed thereto.

2. The process of claim 1 in which the urea synthesis effluent is stripped of ammonia, carbon dioxide and water while flowing as a film of liquid over heat transfer surfaces in cocurrent flow with the gas-vapor mixture evolved from the synthesis effluent and the gas-vapor mixture separated from the unvaporized liquid is cooled and condensed under substantially the same pressure under which the ammonia, carbon dioxide and water are stripped from the synthesis effluent.

3. The process of claim 1 in which ammonia, water and carbon dioxide are stripped from the urea synthesis effluent by heating it under a pressure of 275 to 325 p. s. i. g. to evolve therefrom a gas-vapor mixture having a temperature of 160° to 190° C. containing 4 to 7 $NH_3$/ 1.5 to 2.5 $H_2O/1CO_2$, and the gas-vapor mixture is cooled to a temperature of 65° to 85° C. under 275 to 325 p. s. i. g. to condense the ammonia, carbon dioxide and water.

4. The process of claim 3 in which the urea synthesis effluent is stripped of ammonia, carbon dioxide and water while flowing downwardly as a film of liquid over heat transfer surfaces and in cocurrent flow with the gas-vapor mixture evolved therefrom.

5. The process of claim 3 wherein the urea synthesis effluent contains mol ratios of 5 to 9 $NH_3$/ 2 to 4 $H_2O$/ $1CO_2$, and the gas-vapor mixture is cooled to about 65° to about 85° C. under substantially the same pressure as maintained on the synthesis effluent while it is being stripped, thereby forming the liquid condensate which is recycled to the urea synthesis step.

6. The process of claim 5 in which the urea synthesis effluent is stripped of ammonia, carbon dioxide and water while flowing downwardly as a film of liquid over heat transfer surfaces and in cocurrent flow with the gas-vapor mixture evolved therefrom.

7. The process of claim 1 in which the ammonia and water are supplied to the urea synthesis step in the mol ratios of 3 to 5$NH_3$/1 to 2$H_2O/1CO_2$ to form a synthesis effluent containing 3 to 7 mols ammonia and 2 to 5 mols water for every 1 mol of carbon dioxide, the synthesis effluent is stripped of ammonia and carbon dioxide by heating under a pressure in the range 175–300 p. s. i. g. to evolve a gas-vapor mixture having a temperature in the range 160° to 175° C. and containing 3 to 7 mols ammonia and 1.5 to 3.5 mols water vapor for every 1 mol carbon dioxide, and said gas-vapor mixture is cooled to condense the ammonia, carbon dioxide and water contained therein under a pressure in said range of 175 to 300 p. s. i. g.

8. The process of claim 1 in which the pressure maintained in the urea synthesis step is in the range 2000 to 3200 p. s. i. g.

9. The process of claim 3 in which the pressure maintained in the urea synthesis step is in the range 2000 to 3200 p. s. i. g.

10. The process of claim 4 in which the pressure maintained in the urea synthesis step is in the range 2000 to 3200 p. s. i. g.

11. The process of claim 5 in which the pressure maintained in the urea synthesis step is in the range 2000 to 3200 p. s. i. g.

12. The process of claim 6 in which the pressure maintained in the urea synthesis step is in the range 2000 to 3200 p. s. i. g.

13. The process of claim 7 in which the pressure maintained in the urea synthesis step is in the range 2000 to 3200 p. s. i. g.

References Cited in the file of this patent
UNITED STATES PATENTS

| | | |
|---|---|---|
| 1,868,106 | Kuss et al. | July 19, 1932 |
| 1,908,715 | Miller | May 16, 1933 |
| 2,116,881 | DeRopp | May 10, 1938 |
| 2,267,133 | Porter | Dec. 23, 1941 |
| 2,701,262 | Cook | Feb. 1, 1955 |